United States Patent
Keggenhoff et al.

(10) Patent No.: US 7,442,835 B2
(45) Date of Patent: Oct. 28, 2008

(54) PROCESS AND APPARATUS FOR THE PRODUCTION OF PHOSGENE

(75) Inventors: Berthold Keggenhoff, Krefeld (DE); Heinrich Lokum, Kerpen (DE); Jürgen Münnig, Kaarst (DE)

(73) Assignee: Bayer MaterialScience AG, Leverkusen (DE)

( * ) Notice: Subject to any disclaimer, the term of this patent is extended or adjusted under 35 U.S.C. 154(b) by 292 days.

(21) Appl. No.: 11/211,898

(22) Filed: Aug. 25, 2005

(65) Prior Publication Data

US 2006/0047170 A1    Mar. 2, 2006

(30) Foreign Application Priority Data

Aug. 28, 2004   (DE) .................. 10 2004 041 777

(51) Int. Cl.
*C07C 51/58* (2006.01)

(52) U.S. Cl. .................................................. 562/847

(58) Field of Classification Search ............... None
See application file for complete search history.

(56) References Cited

U.S. PATENT DOCUMENTS

| | | | |
|---|---|---|---|
| 4,073,806 A | 2/1978 | Doubovetzky et al. | 260/544 K |
| 4,231,959 A | 11/1980 | Obrecht | 260/544 K |
| 4,764,308 A | 8/1988 | Sauer et al. | 260/544 K |
| 6,054,612 A | 4/2000 | Cicha et al. | 562/847 |
| 2005/0118068 A1 | 6/2005 | Olbert et al. | 423/416 |

FOREIGN PATENT DOCUMENTS

| | | | |
|---|---|---|---|
| EP | 0003530 | * | 5/1982 |
| GB | 583477 | | 12/1946 |

OTHER PUBLICATIONS

Wikipedia at "http://en.wikipedia.org/wiki/Reboiler", Aug. 10, 2007, pp. 1-3.*

* cited by examiner

*Primary Examiner*—Paul A Zucker
(74) *Attorney, Agent, or Firm*—Lyndanne M. Whalen; N. Denise Brown

(57) ABSTRACT

The invention relates to a process for the production of phosgene, in which chlorine and carbon monoxide are reacted in the presence of an activated charcoal catalyst in a shell-and-tube reactor which contains a plurality of reaction tubes and a coolant space surrounding the reaction tubes, in which
  a) cooling of the reaction tubes is from the outside through the coolant space with water by evaporative cooling, and
  b) operation of the reaction tubes is at a pressure above the pressure in the coolant space.

8 Claims, 3 Drawing Sheets

PROCESS AND APPARATUS FOR THE PRODUCTION OF PHOSGENE

CROSS REFERENCE TO RELATED PATENT APPLICATION

The present patent application claims the right of priority under 35 U.S.C. § 119 (a)-(d) of German Patent Application No. 10 2004 041 777.6 filed Aug. 28, 2004.

BACKGROUND OF THE INVENTION

The present invention relates to a process for the production of phosgene by reacting carbon monoxide (CO) and chlorine on activated charcoal in a shell-and-tube reactor, in which the dissipation of the heat of reaction is accomplished by evaporative cooling with water under reduced pressure. The invention also relates to an apparatus for the production of phosgene, comprising a shell-and-tube reactor, a steam/water separator, a heat exchanger (condenser), a closable vacuum line as well as at least one monitoring device by means of which a leakage of phosgene into the coolant circulation can be detected.

The production of phosgene from CO and chlorine on activated charcoal catalysts in a shell-and-tube reactor is known from the prior art. See, for example, Ullmann's Encyclopedia of Industrial Chemistry, $5^{th}$ Ed., Vol. A 19, p. 413 ff., VCH Verlagsgesellschaft mbH, Weinheim, 1991. An essential objective in this process is the safe dissipation of the considerable heat of reaction generated. This dissipation of heat is normally accomplished by direct cooling. Evaporative cooling is, however, also mentioned in the literature. For example, U.S. Pat. No. 4,231,959 mentions that, apart from direct cooling with water, cooling with boiling water is also possible, in which usable steam is generated. EP-A-134 506 describes the production of phosgene under vapor cooling with a high boiling point medium, which is then used to generate useful steam. Evaporative cooling is also mentioned in general there as a method. At the same time, however, it is stated that a gas temperature in the reactor outlet of below 100° C. must be achieved in order to obtain the necessary low chlorine content of below 50 ppm in the phosgene. Therefore, the process of this invention is also carried out in two stages. In the first stage of this process, the production of phosgene is carried out at high temperature and with evaporative cooling using a high boiling point coolant, and the second stage of this process is carried out at 70° to 100° C. under direct cooling. Finally, WO-A-03/072237 describes a reactor and a process for the production of phosgene, in which the reactor, in a special tubular arrangement, is cooled with a liquid coolant, namely monochlorobenzene. For reasons of corrosion prevention, stainless steel is specified for the reactor tubing. At the same time, however, the problems that can cause corrosion in the event of non-uniform or insufficient cooling are described therein.

Accordingly, the following process-technology objectives arise in the production of phosgene:

On the one hand, a safe and uniform dissipation of heat with the best possible heat transfer coefficients should be ensured so that a gas temperature of less than 100° C. is established in the reactor outlet and a chlorine content of less than 50 ppm is thereby obtained in the phosgene produced by the process. On the other hand, safety technology problems which arise if there is a leakage of heat transfer medium into the reaction space due to corrosion damage must be solved. In this connection, the use of water as heat transfer medium is problematical for safety technology reasons. If water enters the reaction space through, for example, a hole in a reaction tube which was caused or created by corrosion, the water reacts very vigorously with the formed phosgene on the activated charcoal catalyst. Such a reaction between water and phosgene forms hydrochloric acid, and this (i.e. hydrochloric acid), in turn, leads to further corrosion.

Accordingly, the object of the present invention is to provide a process and an apparatus for the production of phosgene in which, as a result of efficient heat dissipation, a gas temperature of below 100° C. and a concentration of chlorine in the phosgene of below 50 ppm is ensured at the outlet of the reactor, and which is simultaneously safe to operate.

SUMMARY OF THE INVENTION

The present invention relates to a process for the production of phosgene which comprises reacting chlorine and carbon monoxide in the presence of an activated charcoal catalyst. The reaction of chlorine and carbon monoxide in the presence of the activated charcoal catalyst occurs in a shell-and-tube reactor which contains a plurality of reaction tubes and a coolant space surrounding the reaction tubes. This process additionally comprises a) cooling of the reaction tubes from the outside through the coolant space by evaporative cooling with water, and b) operating the reaction tubes at a pressure that is above (i.e. higher than) the pressure in the coolant space.

The present invention also relates to an apparatus for carrying out the process of producing phosgene by the reaction of chlorine and carbon monoxide in the presence of an activated charcoal catalyst. This apparatus of the invention comprises:

a) at least one shell-and-tube reactor which has (i) a plurality of reaction tubes which are arranged substantially parallel to one another, (ii) a coolant space for water which surrounds each of the reaction tubes, (iii) at least one inlet opening for water to enter the coolant space, and (iv) at least one outlet opening for water and/or steam to exit from the coolant space, b) at least one water circulation system having (i) a steam/water separator that is hydraulically connected to the outlet opening in the shell-and-tube reactor by means of (ii) a line which feeds the steam/water from the outlet opening to the steam/water separator, (iii) a recycle line exiting the steam/water separator for the separated water to exit through, wherein the recycle line connects to the inlet opening for water in the shell-tube reactor, (iv) a heat exchanger that is hydraulically connected by means of (v) a steam line to the steam/water separator and through which the separated steam from the steam/water exits and condenses, wherein the heat exchanger is connected to the inlet opening for water in the shell-and-tube reactor by a recycle line through which the water that was condensed in the heat exchanger is recirculated to the inlet opening for water into the shell-and-tube reactor, c) a vacuum line that is hydraulically connected to the steam/water separator, to the steam line and/or to the heat exchanger, wherein the vacuum line may be connected to a device that is capable of generating a vacuum or the vacuum line may be closed, and d) at least one monitoring device to detect phosgene present in the water circulation and/or the coolant space, with the monitoring device arranged either in the water circulation system or in the coolant space.

BRIEF DESCRIPTION OF THE FIGURES

FIG. 2 illustrates another embodiment of a suitable apparatus for the production of phosgene according to the invention.

DETAILED DESCRIPTION OF THE INVENTION

Figure 1:
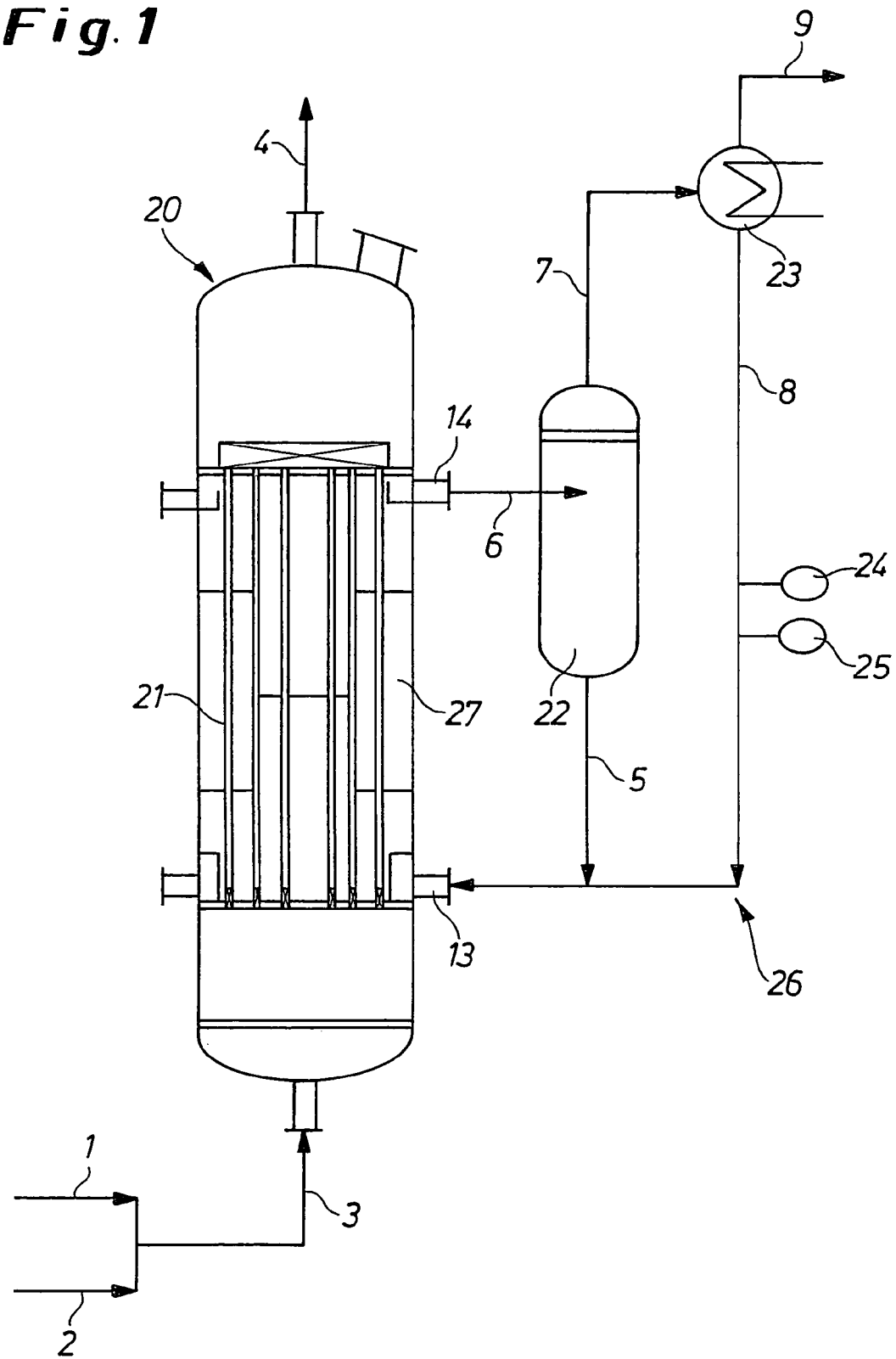
FIG. 1 is a schematic representation of an apparatus comprising one shell-and-tube reactor. This Figure represents one embodiment of a suitable apparatus for the production of phosgene according to the invention. This apparatus is suitable for carrying out the process of producing phosgene according to the invention.

The process according to the present invention is characterized by the fact that the dissipation of the heat of reaction from the production of phosgene is accomplished by evaporative cooling with water under reduced pressure, and preferably below atmospheric pressure of 1 bar absolute.

The coolant circulation is, in this connection, preferably a closed circulation system in which water is evaporated, removed, condensed at another site and then recycled to the coolant space for renewed evaporation. In this sense, the coolant space in the shell-and-tube reactor preferably contains (at all times) liquid water that is boiling.

Therefore, the pressure in the reaction space is maintained above the pressure in the coolant space so that, in the event of damage to the reaction tubes, phosgene passes from the reaction tubes into the coolant space, but no water passes from the coolant space into the product space (i.e. the reaction tubes of the reactor). The coolant space is monitored by means of suitable monitoring devices for any signs of phosgene in the coolant space as the presence of phosgene in the coolant space is indicative of damage to the reaction tubes of the shell-and-tube reactor. Thus, this continuous monitoring avoids any consequential damage.

The feedstock streams of CO and chlorine are used in the process according to the invention in relative quantities so as to achieve a low chlorine content in the phosgene produced by the process. It is preferred in the process, that a molar excess of CO of from 2 to 20% is present, and more preferably a molar excess of from 5 to 12% is present, based on chlorine content. Any commercially available gas mixer, such as, for example, orifice mixers, static mixers or swirl-type mixers, may be used as a gas mixer to mix the chlorine and CO, which is then fed into the process and apparatus of the present invention. Depending on the conduit arrangement, however, it may be essential to use a special gas mixer. The absolute pressure of the mixed gas is, in this embodiment, preferably from 1.5 to 10 bar, and more preferably from 2 to 5 bar.

By a suitable choice of coolant pressure, the coolant temperature and as a result, the product outlet temperature, can reliably be maintained below 100° C. The cooling of the shell-and-tube reactor via the coolant space and the water circulation system connected thereto via the inlet opening and the outlet opening is preferably effected with water at an absolute pressure of 0.1 to 0.8 bar, more preferably 0.15 to 0.5 bar and most preferably 0.2 to 0.3 bar. This absolute pressure results in water boiling temperatures of 45° C. to 93.5° C. (at 0.1 to 0.8 bar), 55° to 80° C. (at 0.15 to 0.5 bar) and 60° to 70° C. (at 0.2 to 0.3 bar). In this way, it is ensured that phosgene leaves the shell-and-tube reactor at a temperature of below 100° C.

The absolute pressure in the reaction tubes is preferably 1.5 to 10 bar, and more preferably 2 to 5 bar.

The process according to the invention may, for example, be carried out in the apparatus described hereinafter.

The present invention also relates to an apparatus for the production of phosgene by reacting chlorine and carbon monoxide in the presence of an activated charcoal catalyst, in which the apparatus comprises a) at least one shell-and-tube reactor having a plurality of reaction tubes which are arranged in the reactor substantially parallel to one another, a coolant space for water which essentially surrounds the reaction tubes, at least one inlet opening into the tube-and-shell reactor for water to enter the coolant space, and at least one outlet opening in the tube-and-shell reactor for water and/or steam to exit the coolant space, b) at least one water circulation system comprising a steam/water separator that is hydraulically connected to the outlet opening in the shell-and-tube reactor via a line or conduit, a recycle line or conduit for the water which is separated in the steam/water separator and which leads to (or feeds into) the inlet opening in the shell-and-tube reactor, a heat exchanger that is hydraulically connected via a steam line to the steam/water separator, with the steam that is separated in the steam/water separator being transported via the steam line to the heat exchanger where it is condensed to water, and a recycle line exiting the heat exchanger to transport the water condensed in the heat exchanger back to the inlet opening in the shell-and-tube reactor, c) at least one vacuum line which is hydraulically connected to the steam/water separator, to the steam line and/or to the heat exchanger, in which the vacuum line can be connected to a device capable of generating a vacuum, and in which the vacuum line can be closed, and d) at least one monitoring device that is arranged in the water circulation system or in the coolant space in the shell-and-tube reactor, wherein the monitoring device is capable of detecting any phosgene that has escaped into the water circulation system or into the coolant space in the shell-and-tube reactor.

In addition, in a preferred embodiment, the apparatus of the present invention contains more than one shell-and-tube reactors which are connected in parallel or in series. In such an embodiment, the number of water circulation systems, vacuum lines, heat exchangers, etc., that are present preferably corresponds to the number of shell-and-tube reactors present. In other words, if there are two shell-and-tube reactors, there are preferably two water circulation systems, two vacuum lines and two heat exchangers. Thus, each of the individual reactors which are connected in series preferably comprises elements a) through d) as described hereinabove.

In the apparatus of the present invention, it is preferred that the heat exchanger is arranged above the shell-and-tube reactor so that the condensed water exiting the heat exchanger can flow back under the force of gravity, and into the coolant space of the shell-and-tube reactor.

Figure 2:
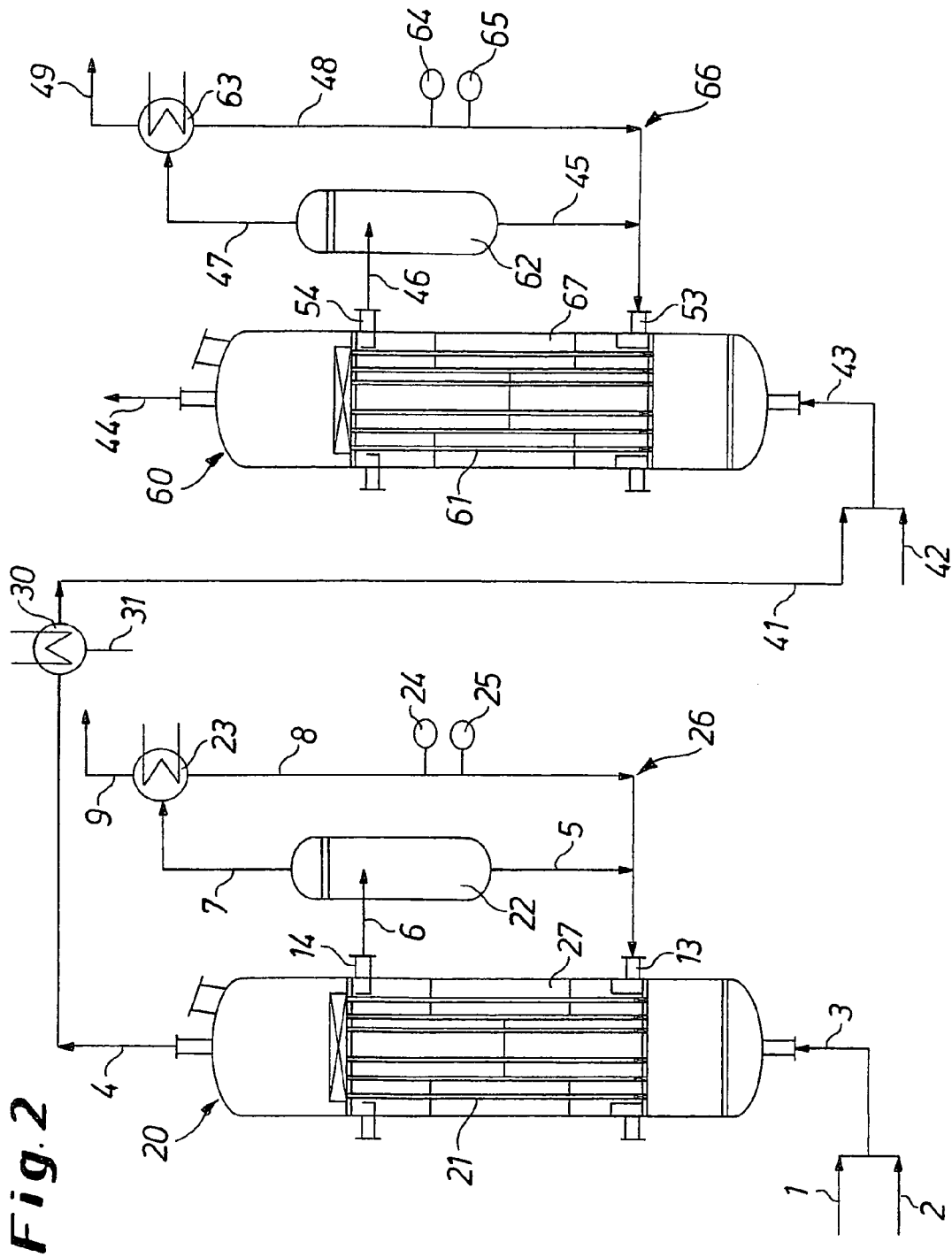
FIG. 2 is a schematic representation of an apparatus comprising two shell-and-tube reactors which are connected in series.

In accordance with the present invention, it is preferred that the shell-and-tube reactors used are the technically conventional, standing shell-and-tube reactors which preferably contain from 100 to 10,000 tubes, and more preferably from 300 to 3000 tubes. In this sense, the reactor tubes preferably have a length of 1 to 6 m and more preferably 2 to 4 m, and an internal tubular diameter of preferably 20 to 100 mm and more preferably 30 to 70 mm. Just one shell-and-tube reactor may be used, or alternatively several, and preferably two or three, shell-and-tube reactors may be connected in parallel or in series with one another. Such a serial arrangement of shell-and-tube reactors is illustrated in FIG. 2.

It is preferred that the reaction tubes within the shell-and-tube reactor are arranged in a triangular configuration. Furthermore, it is preferred, especially in the case of long reactors with a large number of tubes, that flow deflectors such as, for example, deflector plates (baffles), are mounted in the coolant space at an interspacing of 200 to 2000 mm, and preferably of 800 to 1200 mm. In addition, particularly with large units, an annular channel is in each case incorporated, preferably in the region of the inlet opening into the coolant space and the outlet opening from the coolant space, in order to equalise the flow. Finally, suitable installed fittings for gas distribution such as, for example, swirl plates or static mixer elements, may be provided in the region of the gas inlet in the shell-and-tube reactor.

The reactor may be fabricated from carbon steel or various chrome-nickel steels or other higher-alloyed steels. Although the product temperature in the reaction tubes exceeds 200° C., there is surprisingly no corrosion observed when using the process and/or the apparatus of the present invention, even with reactors which are made from carbon steel. Thus, carbon steel is preferred for economic reasons.

The reaction tubes are packed with activated charcoal. The commercially available extruded molded cylinders of activated charcoal with a grain size of, for example, 2 to 4 mm are preferred. The lowest region of the reaction tubes is, in this sense, preferably first of all filled to a height of 100 to 500 mm with a catalytically inactive packing such as, for example, ceramic packing bodies or metal packing bodies, onto which the activated charcoal is then packed. Suitable means for retaining the activated charcoal are preferably provided on the gas outlet side from the reaction tubes. One such suitable means for retaining the activated charcoal is, for example, a retaining grating, an additional inert packing on the tube floor or, preferably, a bed of the same activated charcoal above the tube floor to a height of 100 to 500 mm.

These shell-and-tube reactors are ideally suited for the implementation of the process according to the invention.

As a heat exchanger, it is possible to use conventional shell-and-tube heat exchangers with cooling water or air condensers or other condensers which are known to the person skilled in the art. Commercially available vacuum pumps such as, for example, piston pumps, fans or ring liquid pumps, or also vacuum jet devices operating with steam, air or nitrogen as pumping fluid, are suitable to be used as vacuum-generating devices.

Various monitoring devices may be employed to secure the system in the event of damage, especially in the event of corrosion in the reaction tubes. These monitoring devices will preferably stop the reaction if a predetermined triggering threshold is exceeded, preferably by shutting off the feed of reactants, and converting the apparatus to a safe state. Suitable monitoring devices detect, for example, the pressure and/or temperature of the cooling water or steam, display these values, and trigger an alarm if a predetermined triggering threshold is exceeded and/or bring the apparatus of the invention to a safe operating state or resting state. Suitable measurement quantities that may also be monitored either instead of or in addition to the pressure and/or temperature, include, for example, the conductivity and/or the pH value of the water. Also, suitable as monitoring devices are analysers for detecting traces of phosgene in the gas space of the steam lines (see, for example, steam lines 7 and 47 in FIGS. 1 and 2).

The monitoring devices are, in this connection, preferably installed in diversely redundant form.

The process according to the invention and the apparatus according to the invention have the following significant advantages in comparison to the processes and apparatuses which are known and described in the prior art:

These apparatuses are easily fabricated and, unlike systems operating by direct cooling with liquids without evaporation, they do not require coolant pumps. If an air condenser is used, the cooling system is intrinsically safe even in the event of an energy malfunction. The heat transfer coefficients that are achieved in the apparatuses and processes of the present invention are in the range from 1000 to 1500 $W/m^2K$, and thus, are significantly higher than the values achieved with liquid cooling. This, combined with the high reliability of the cooling system, makes it is possible to construct the system from carbon steel without corrosion occurring. The system produces phosgene with a low chlorine content, which may be maintained even below 20 ppm chlorine, and as a result, the resultant products (e.g. the isocyanates produced from the resultant phosgene) are particularly pure. Due to the redundant monitoring systems, the process is particularly reliable in operation.

The invention is described in more detail hereinafter with the aid of the accompanying figures, i.e. FIGS. 1-3.

FIG. 1 is a schematic representation of an apparatus according to the invention which has one shell-and-tube reactor. A portion of the outer reactor is cut-away in FIG. 1 to illustrate the shell-and-tube reactor.

FIG. 2 is a schematic representation of an apparatus according to the invention which has two shell-and-tube reactors that are connected in series. FIG. 2 also has a portion of the outer reactor cut-away to illustrate the shell-and-tube reactor.

Figure 3:
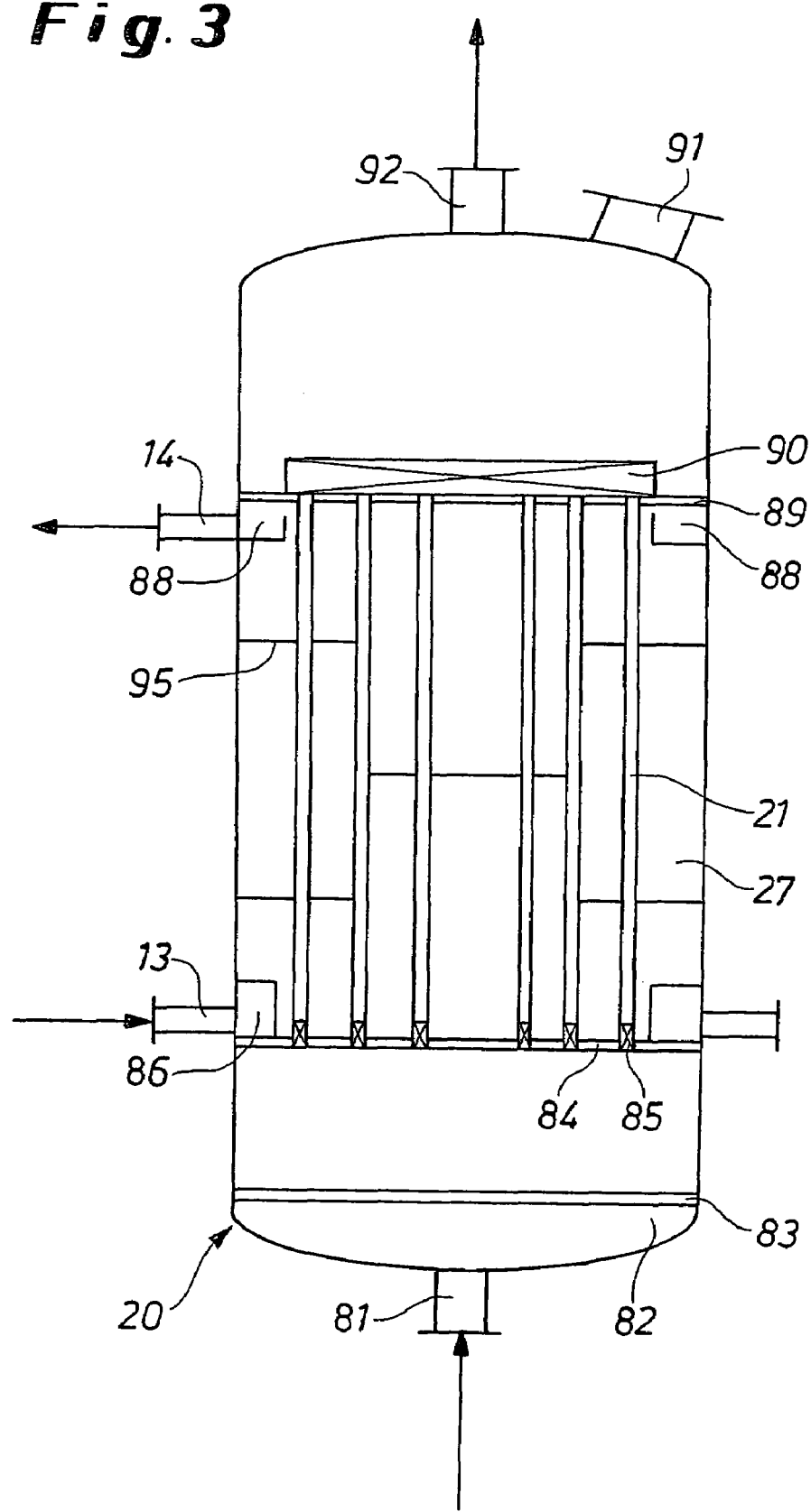
FIG. 3 is an enlarged view of a shell-and-tube reactor which has a portion of the exterior of the reactor cut-away. This shell-and-tube reactor is a suitable reactor or the shell-and-tube reactor shown in the schematic of the apparatus as illustrated in FIG. 1 or FIG. 2.

FIG. 3 illustrates an enlarged view of a shell-and-tube reactor which also has a portion of the outer reactor shell cut-away. This shell-and-tube reactor is suitable for use in the process according to the invention, and in the schematics as illustrated in FIGS. 1 and 2.

Reference will now be made to one embodiment of the present invention as illustrated in FIG. 1, a schematic representation of a suitable apparatus having one shell-and-tube reactor, and which is suitable for the production of phosgene in accordance with the present invention.

In FIG. 1, the educts CO and chlorine are conveyed and metered via associated lines 1 and 2 and are then mixed. This may take place in a special gas mixer such as, for example, an orifice mixer or nozzle mixer, or it may also take place spontaneously if the inlet line 3 is sufficiently long. The gas mixture then enters into the shell-and-tube reactor 20 from below, through the line 3. In the shell-and-tube reactor 20, the tubes 21 are filled with activated charcoal. It is in the tubes 21 that the reaction to form the process product phosgene takes place. The phosgene is withdrawn from the shell-and-tube reactor 20 through the product line 4. In order to dissipate the heat of reaction from the phosgene production in the shell-and-tube reactor 20, water flows into the shell-and-tube reactor 20, from below through the inlet water opening 13 and enters into the coolant space 27 of the shell-and-tube reactor 20. The water in the coolant space 27 boils in the shell-and-tube reactor 20, and then exits the shell-and-tube reactor 20 as a steam/water mixture through the water outlet opening 14, and passes via the line 6 to the steam/water separator 22. The liquid water fractions are separated in the steam/water separator 22. The steam from the steam/water separator 22 is transported via the steam line 7 to the heat exchanger 23 (which is preferably a condenser) and is condensed therein.

The condensate stream from the heat exchanger 23 flows back through the recycle line 8 to the water inlet opening 13, and then enters the coolant space 27 of the shell-and-tube reactor 20. Also, the liquid water stream obtained in the steam/water separator 22 flows back through the recycle line 5 to the water inlet opening 13, and enters coolant space 27 of the shell-and-tube reactor 20. In the embodiment illustrated in FIG. 1, the recycle lines 5 and 8 are combined at a point before the water inlet opening 13 and form a common line up to the water inlet opening 13.

Monitoring devices 24 and 25 for monitoring, for example, the pressure and temperature are arranged in FIG. 1 in the recycle line 8. These and other monitoring devices detect any phosgene that has leaked or otherwise escaped from the reaction tubes 21 and entered into the water circulation system 26.

During normal operation of the apparatus, the water circulation system 26 is hermetically closed. If necessary, however, the water circulation 26 can be subjected to an operating vacuum with a vacuum generator via the vacuum line 9, by an inert gas stream exiting from the heat exchanger 23 of the water circulation system 26 through the vacuum line 9.

The coolant system of the apparatus illustrated by the schematic in FIG. 1 consists of the coolant space 27 and the water circulation system 26, which is connected to the coolant space 27 via the water inlet opening 13 and the water outlet opening 14. Thus, in this sense, the water circulation system 26 comprises the line 6, the steam/water separator 22, the steam line 7, the heat exchanger 23 and the recycle lines 5 and 8.

After the coolant system has been filled with water, a vacuum is placed on the coolant system via the vacuum line 9. The coolant system may then be separated from the vacuum unit and thus, operated as a closed system. Over prolonged operation, the pressure of the coolant system may slowly rise due to small leakages in seals, which means that occasional post-vacuumization may become necessary. Of course, the necessary reduced pressure can also be achieved by constant vacuumization of the coolant system. The filling of the water circulation system 26 may, for example, be effected by a connection, which is provided in the lines 5 or 8, to a water feed.

Reference will now be made to FIG. 2, which illustrates a second embodiment of the present invention. FIG. 2 is a schematic representation of a suitable apparatus which has two shell-and-tune reactors that are connected in series. This apparatus is also suitable for carrying out the process of producing phosgene in accordance with the present invention.

In the embodiment illustrated in FIG. 2, phosgene production is carried out in two stages. In FIG. 2, the reference numerals used to describe the first shell-and-tube reactor correspond to the same apparatus parts of the shell-and-tube reactor in FIG. 1. In FIG. 2, the starting substances CO and chlorine are conveyed in a metered manner through associated lines 1 and 2 and are then mixed. The gas mixture is introduced into the shell-and-tube reactor 20 from below through inlet line 3 and enters the first reaction stage. In the shell-and-tube reactor 20, the reaction tubes 21 are filled with activated charcoal. It is in these reaction tubes 21 that the first stage of the reaction to form phosgene takes place.

Also in FIG. 2, in the first of the reactors connected in series, it is necessary to dissipate the heat of reaction from the phosgene production in the shell-and-tube reactor 20. This is accomplished by water flowing into the shell-and-tube reactor 20, from below through the inlet water opening 13 such that the water enters into the coolant space 27 of the shell-and-tube reactor 20. Due to the heat of reaction, the water in the coolant space 27 boils in the shell-and-tube reactor 20, and then exits the shell-and-tube reactor 20 as a steam/water mixture through the water outlet opening 14, and passes via the line 6 to the steam/water separator 22. The liquid water fractions are separated in the steam/water separator 22. The steam from the steam/water separator 22 is transported via the steam line 7 to the heat exchanger 23 (which is preferably a condenser) and is condensed therein. The condensate stream from the heat exchanger 23 flows back through the recycle line 8 to the water inlet opening 13, and then enters the coolant space 27 of the shell-and-tube reactor 20. Also, the liquid water stream obtained in the steam/water separator 22 flows back through the recycle line 5 to the water inlet opening 13, and enters coolant space 27 of the shell-and-tube reactor 20. In the embodiment illustrated in FIG. 2, the recycle lines 5 and 8 are combined at a point before the water inlet opening 13 and form a common line up to the water inlet opening 13.

Monitoring devices 24 and 25 which monitor, for example, the pressure and temperature are arranged in FIG. 2 in the recycle line 8. These and other monitoring devices detect any phosgene that has escaped from the reaction tubes 21 and entered into the water circulation system 26.

During normal operation of the apparatus, the water circulation system 26 is hermetically closed. If necessary, however, the water circulation 26 can be subjected to an operating vacuum with a vacuum generator via the vacuum line 9, by an inert gas stream exiting from the heat exchanger 23 of the water circulation system 26 through the vacuum line 9.

The coolant system of the apparatus illustrated by the schematic in FIG. 2 consists of the coolant space 27 and the water circulation system 26, which is connected to the coolant space 27 via the water inlet opening 13 and the water outlet opening 14. Thus, in this sense, the water circulation system 26 comprises the line 6, the steam/water separator 22, the steam line 7, the heat exchanger 23 and the recycle lines 5 and 8.

After the coolant system has been filled with water, a vacuum is placed on the coolant system via the vacuum line 9. The coolant system may then be separated from the vacuum unit and thus, operated as a closed system. Over prolonged operation, the pressure of the coolant system may slowly rise due to small leakages in seals, which means that occasional post-vacuumization may become necessary. Of course, the necessary reduced pressure can also be achieved by constant vacuumization of the coolant system. The filling of the water circulation system 26 may, for example, be effected by a connection, which is provided in the lines 5 or 8, to a water feed.

In the first reaction stage of FIG. 2, the phosgene that is formed is withdrawn from the shell-and-tube reactor 20 via line 4 and condensed in the condenser 30. The liquid phosgene stream is withdrawn from the condenser 30 as valuable product via the line 31, and the residual gas stream from the condenser 30 is fed through the line 41 to the second stage, where it is mixed with chlorine fed in through the line 42. The gas mixture is then led via line 43 into the second shell-and-tube reactor 60, reacted in the reaction tubes 61, and the phosgene that is formed is then removed via the line 44. In the second stage, substantially the same processes occur as previously described in the first stage.

In order to dissipate the heat of reaction, water flows from below through the inlet opening 53 into the coolant space 67 of the second shell-and-tube reactor 60, boils in the shell-and-tube reactor 60 and then exits as a steam/water mixture through the outlet opening 54, and passes through line 46 to the steam/water separator 62. The liquid water fractions are separated in the steam/water separator 62. The steam from the steam/water separator 62 is transported via line 47 to the heat exchanger 63 (preferably a condenser) and is condensed therein. The condensate stream from the heat exchanger 63 flows back again through recycle line 48 to the inlet opening 53. Also, the liquid water stream obtained in the steam/water separator 62 flows back through the recycle line 45 to the inlet opening 53. In the embodiment illustrated here, the recycle lines 45 and 48 are combined before inlet opening 53 and routed as a common line up to the inlet opening 53.

Monitoring devices 64 and 65 capable of monitoring, for example, the pressure and temperature are arranged in recycle line 48. These and other monitoring devices detect any phosgene that has leaked or escaped from the reaction tubes 61 and entered into the water circulation system 66.

In normal operation, the water circulation system 66 is hermetically closed. If necessary, however, the water circulation system 66 may however be subjected to the operating vacuum with the vacuum generator via the vacuum line 49, by an inert gas stream then exiting from the water circulation system 66 via the vacuum line 49.

In addition, in the second stage of the apparatus, the residual gas stream from line 41, exiting the condenser 30 from the first stage of the apparatus, contains as principal constituent CO in a concentration of 30 to 70 wt. %. This residual gas stream 41 containing 30 to 70 wt. % CO is mixed with sufficient chlorine from the line 42 so as to achieve a molar CO excess of 5 to 20% in line 43. The gas mixture in line 43 is introduced from below into the shell-and-tube reactor 60 of the second stage of the apparatus, in which the tubes 61 are filled with activated charcoal, and in which the second stage of the reaction to form phosgene occurs.

Due to this two-stage procedure, the CO that is used in the reaction process is utilised to a maximum extent, and thereby avoids a significant CO fraction in the resultant phosgene. The shell-and-tube reactor 60 and the water circulation system 66 are designed such that these function identically to the shell-and-tube reactor 20 and the water circulation 26 (respectively) of the first stage. However, due to the smaller gas loading required, these (i.e. shell-and-tube reactor 60 and water circulation system 66) may, optionally, be of smaller dimensions. It may, however, also be advantageous to design both systems identically in dimension, so that the system of the second stage can serve as reserve system for the first stage if the latter is temporarily out of operation, for example, on account of a change of catalyst.

Reference will now be made to FIG. 3, which illustrates an enlarged view of a shell-and-tube reactor which also has a portion of the outer reactor shell cut-away. This shell-and-tube reactor is suitable for carrying out the process of producing phosgene in accordance with the present invention, and can be substituted for any of the shell-and-tube reactors in the schematics as illustrated in FIGS. 1 and 2.

In FIG. 3, shell-and-tube reactor 20 can be employed in the process according to the invention and in the apparatus according to the present invention. Shell-and-tube reactor 20 comprises a gas inlet opening 81 for the feed streams of CO and chlorine (not shown), a lower cover 82 on the reactor having installed fittings 83 for the distribution of the feed gas. Inside the shell-and-tube reactor 20, is a lower tube floor 84, on which the lower ends of the reaction tubes 21 rest. A packing 85 consisting of an inert material is present in the lower ends of the reaction tubes 21. A lower annular channel 86 in shell-and-tube reactor 20 is located in the region of the water inlet opening 13 through which water enters into the coolant space 27, and surrounds the reaction tubes 21. Deflecting elements 95 for deflecting the flow of water in the coolant space 27 are present in the shell-and-tube reactor above the lower tube floor 84 and below the upper tube floor 89. These deflecting elements 95 prevent the cooling water from exiting through the water outlet opening 14 immediately after entering the shell-and-tube reactor 20 through the water inlet opening 13, or at a point before the water boils and condenses. Higher up in the shell-and-tube reactor 20, in the region of the water outlet opening 14 from which water exits the coolant space 27, is an upper annular channel 88 and an upper tube floor 89. The upper tube floor 89 is at the top of the upper ends of the reaction tubes 21. A packing 90 consisting of an inert material is located above the upper tube floor 89. Above the upper tube floor 89 and packing 90, is an entry manhole 91 located at or near the top of the shell-and-tube reactor 20 for access to the inside of the shell-and-tube reactor 20 to carry out repair or maintenance work. Also, at or near the top of the shell-and-tube reactor 20 is a gas outlet opening 92 for the outlet of the phosgene produced by the process of the present invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of phosgene, comprising reacting chlorine and carbon monoxide in the presence of an activated charcoal catalyst in a shell-and-tube reactor which contains a plurality of reaction tubes and a coolant space that surrounds the reaction tubes, wherein
   a) cooling of the reaction tubes is from the outside through the coolant space with water by evaporative cooling, and
   b) operating the reaction tubes at a pressure that is above the pressure in the coolant space.

2. The process of claim 1, wherein carbon monoxide is added in a molar excess of from 2 to 20%, based on the amount of chlorine added.

3. A process, for the production of phosgene, comprising reacting chlorine and carbon monoxide in the presence of an activated charcoal catalyst in a shell-and-tube reactor which contains a plurality of reaction tubes and a coolant space that surrounds the reaction tubes, wherein
   a) cooling of the reaction tubes is from the outside through the coolant space with water by evaporative cooling, and
   b) operating the reaction tubes at a pressure that is above the pressure in the coolant space, wherein the absolute pressure in the coolant space is from 0.1 to 0.8 bar.

4. The process of claim 3, wherein the absolute pressure in the coolant space is from 0.15 to 0.5 bar.

5. The process of claim 1, additionally comprising recondensing the steam that evaporates in the coolant space in step a) in a heat exchanger, and recycling the condensed water to the coolant space.

6. The process of claim 5, additionally comprising separating the steam that evaporates in the coolant space in step a) from the liquid water before recondensing the steam in a heat exchanger.

7. The process of claim 5, in which the heat exchanger is arranged above the shell-and-tube reactor such that the condensed water flows back under the action of gravity into the coolant space of the shell-and-tube reactor.

8. The process of claim 7, in which the coolant recirculation is closed.

* * * * *